United States Patent
Lee

(10) Patent No.: US 9,193,841 B2
(45) Date of Patent: *Nov. 24, 2015

(54) FILM COMPRISING A MIXTURE OF POLY (M-PHENYLENE ISOPHTHALAMIDE) AND COPOLYMER MADE FROM (6)-AMINO-2-(P-AMINOPHENYL) BENZIMIDAZOLE

(71) Applicant: E I DU PONT DE NEMOURS AND COMPANY, Wilmington, DE (US)

(72) Inventor: Kiu-Seung Lee, Midlothian, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,649

(22) Filed: Oct. 29, 2014

(65) Prior Publication Data

US 2015/0119533 A1    Apr. 30, 2015

Related U.S. Application Data

(60) Provisional application No. 61/897,612, filed on Oct. 30, 2013.

(51) Int. Cl.
*C08L 77/00* (2006.01)
*C08J 5/18* (2006.01)

(52) U.S. Cl.
CPC .............. *C08J 5/18* (2013.01); *C08J 2377/00* (2013.01); *C08J 2379/04* (2013.01); *C08J 2477/00* (2013.01); *C08J 2479/04* (2013.01)

(58) Field of Classification Search
None
See application file for complete search history.

(56) References Cited

U.S. PATENT DOCUMENTS

| | | | |
|---|---|---|---|
| 3,069,366 A | 11/1962 | DuPont |
| 3,227,793 A | 1/1966 | Cipriani |
| 3,287,324 A | 11/1966 | Sweeny |
| 3,354,127 A | 11/1967 | DuPont |
| 3,414,645 A | 12/1968 | Morgan |
| 3,511,819 A | 5/1970 | DuPont |
| 3,767,756 A | 10/1973 | DuPont |
| 3,869,429 A | 3/1975 | Blades |
| 3,869,430 A | 3/1975 | Blades |
| 4,668,234 A | 5/1987 | Vance et al. |
| 4,755,335 A | 7/1988 | Ghorashi |
| 4,883,496 A | 11/1989 | Ghorashi |
| 5,096,459 A | 3/1992 | Ghorashi |
| 5,667,743 A | 9/1997 | Tai et al. |

FOREIGN PATENT DOCUMENTS

| | | | |
|---|---|---|---|
| GB | 1381181 | | 1/1975 |
| JP | 74012341 | * | 3/1974 |
| RU | 2180369 | | 3/2002 |
| RU | 2345988 | | 2/2009 |

* cited by examiner

*Primary Examiner* — Ana Woodward

(57) ABSTRACT

This invention relates to a film comprising a mixture of at least a first polymer and a second polymer;

the first polymer derived from the reaction of one or more amine monomers and a plurality of acid monomers, wherein the one or more amine monomers includes at least 60 mole percent 5(6)-amino-2-(p-aminophenyl) benzimidazole, based on the total amount of amine monomers; and the plurality of acid monomers include those having a structure of

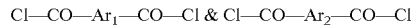

Cl—CO—Ar$_1$—CO—Cl & Cl—CO—Ar$_2$—CO—Cl wherein Ar$_1$ is an aromatic group having para-oriented linkages and Ar$_2$ is an aromatic group having meta-oriented linkages, and wherein the plurality of acid monomers has at least 50 mole percent of the monomer containing aromatic group Ar$_2$; and the second polymer derived from the reaction of metaphenylene diamine and isophthaloyl chloride.

5 Claims, 1 Drawing Sheet

FILM COMPRISING A MIXTURE OF POLY (M-PHENYLENE ISOPHTHALAMIDE) AND COPOLYMER MADE FROM (6)-AMINO-2-(P-AMINOPHENYL) BENZIMIDAZOLE

BACKGROUND OF THE INVENTION

Field of the Invention

The invention concerns a shaped article, such as a film, that is made from a mixture of at least two polymers, wherein at least one polymer comprises poly(meta-phenylene isophthalamide)(MPD-I) and the other polymer is a copolymer made from the diamine monomer 5(6)-amino-2-(p-aminophenyl)benzimidazole (DAPBI), and methods of making the same. These shaped articles have demonstrated properties associated with DAPBI-based polymers, such as acid dyeability.

It has been found that by coagulating a composite polymer solution containing a homogeneous mixture of MPD-I with a copolymer having charge characteristics opposite to MPD-I, made from the monomer (DAPBI), a shaped article can be made that only accepts acid dyes. This characteristic is due to a surprising sheath-core-like structure formed from that homogeneous composite polymer solution during coagulation.

Further, it is believed the faster coagulating MPD-I homopolymer forces the slower coagulating DAPBI-based copolymer to migrate to the surface of the shaped article during the shaping process. The shaped articles are believed to present the improved properties of the more expensive DAPBI copolymer while containing a significant amount of the less expensive MPD-I homopolymer. Specifically, the shaped articles have a dielectric strength similar to articles made solely with the DAPBI copolymer, which has a higher dielectric strength than MPD-I homopolymer, The shaped articles also have improved thermal stability reflective of the limiting oxygen index (L.O.I.) of 45 for DAPBI, versus the lower L.O.I. of about 30 for MPD-I.

SUMMARY OF THE INVENTION

This invention relates to a film comprising a mixture of at least a first polymer and a second polymer;

the first polymer having a structure derived from the reaction of one or more amine monomers and a plurality of acid monomers, wherein
i) the one or more amine monomers includes at least 60 mole percent 5(6)-amino-2-(p-aminophenyl)benzimidazole, based on the total amount of amine monomers; and
ii) the plurality of acid monomers include those having a structure of

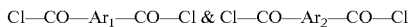

wherein $Ar_1$ is an aromatic group having para-oriented linkages and $Ar_2$ is an aromatic group having meta-oriented linkages, and wherein the plurality of acid monomers has at least 50 mole percent of the monomer containing aromatic group $Ar_2$; and the second polymer having a structure derived from the reaction of metaphenylene diamine and isophthaloyl chloride.

DETAILED DESCRIPTION

Figure 1:
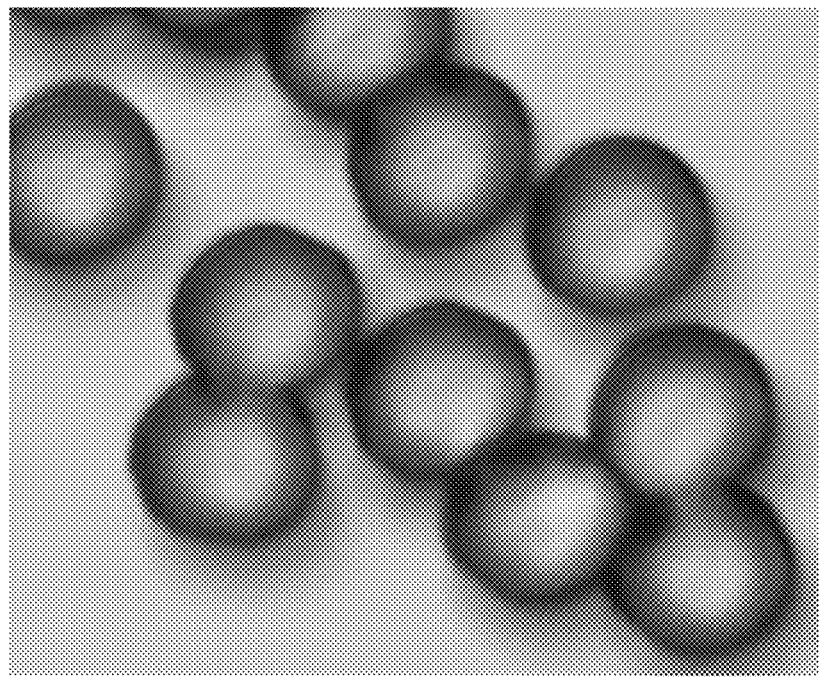
FIG. 1 is a photographic representation of dyed filament cross-section having a composition, by weight, of 50% first polymer and 50% second polymer, as spun through standard round spinneret holes.

The invention concerns a shaped article, namely a film, comprising a mixture of at least a first polymer and a second polymer. The first polymer preferably is dyeable with acid dyes while the second polymer preferably is dyeable with basic dyes.

The first polymer has a structure derived from the reaction of one or more amine monomers and a plurality of acid monomers, wherein the one or more amine monomers includes at least 60 mole percent 5(6)-amino-2-(p-aminophenyl)benzimidazole (DAPBI), based on the total amount of amine monomers. One preferred first polymer is made substantially from 60 to 80 mole percent DAPBI diamine monomer. In some other embodiments, the one or more amine monomers is 100 mole percent 5(6)-amino-2-(p-aminophenyl) benzimidazole (DAPBI). In some embodiments, the one or more amine monomers include metaphenylene diamine (MPD) in addition to the DAPBI. In some embodiments, the DAPBI is combined with 20 to 40 mole percent MPD amine monomer, with 60/40 DAPBI/MPD being a most preferred combination.

The one or more amine monomers are copolymerized with a plurality of acid monomers in a compatible solvent to create a copolymer. The plurality of acid monomers includes those having a structure of

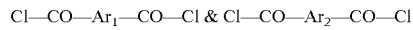

wherein $Ar_1$ is an aromatic group having para-oriented linkages and $Ar_2$ is an aromatic group having meta-oriented linkages. The plurality of acid monomers has at least 50 mole percent of the monomer containing aromatic group $Ar_2$.

$Ar_1$ and $Ar_2$ can be any unsubstituted or substituted aromatic ring structures but are preferably benzene groups. A preferred acid monomer containing aromatic group $Ar_2$ is isophthaloyl dichloride and a preferred aromatic group containing $Ar_1$ is terephthaloyl dichloride. In some embodiments, the plurality of acid monomers has 60 to 80 mole percent of the monomer containing aromatic group $Ar_2$ having meta-oriented linkages and 20 to 40 mole percent of the monomer containing the aromatic group $Ar_1$ having para-oriented linkages.

Useful general techniques for making the monomer 5(6)-amino-2-(p-aminophenyl)benzimidazole (DAPBI) and the first polymer include those disclosed in, for example, Russian Federation Pat. Nos. 2,345,988 to Vulakh et al. and 2,180,369 to Machalaba et al.; Great British Pat. No. 1,381,181 to Kudryavtsev et al.; and U.S. Pat. No. 3,511,819 to Bleasdale and U.S. Pat. No. 3,354,127 to Hill et al.

In some embodiments, the first polymer can be dyed with one or more acidic dyes; that is, the polymer accepts and can be colored by a dye having a negative-charge-seeking positive (or electron-deficient) center.

The second polymer has a structure derived from the reaction of metaphenylene diamine and isophthaloyl chloride. The preferred second polymer is poly (metaphenylene isophthamide) in the form of a polyamide homopolymer. As an aramid, it has at least 85% of the amide (—CONH—) linkages attached directly to two aromatic rings. The rings can be unsubstituted or substituted. The preferred second polymer is a meta-aramid, wherein the two rings or radicals are meta-oriented with respect to each other along the molecular chain.

Preferably, the second polymer derived from the reaction of metaphenylene diamine and isophthaloyl chloride has no more than 10 percent of other diamines substituted for a primary metaphenylene diamine used in forming the polymer or no more than 10 percent of other diacid chlorides substituted for a primary isophthaloyl chloride used in forming the polymer.

Useful general techniques for making the second polymer, and specifically poly (meta-phenylene isophthalamide) (MPD-I), include those disclosed in, for example, U.S. Pat. Nos. 3,063,966; 3,227,793; 3,287,324; 3,414,645; and 5,667,743.

In some embodiments, the second polymer can be dyed with one or more basic dyes; that is, the polymer accepts and can be colored by a dye having a positive-charge-seeking negative (or electron-rich) center.

The homogeneous mixture of at least a first polymer and a second polymer used to make the shaped articles preferably contains 25 to 80 weight percent of the first polymer, based on the total amount of first polymer and second polymer. When the shaped article contains only the first polymer and the second polymer, the shaped article preferably contains 25 to 80 weight percent of the first polymer and 20 to 75 weight percent of the second polymer.

In some embodiments, the homogeneous mixture of at least a first polymer and a second polymer used to make the shaped article preferably contains 25 to 50 weight percent of the first polymer, based on the total amount of first polymer and second polymer.

While other polymers or copolymers can be mixed in with the mixture of the first and second polymers, in a preferred embodiment the mixture contains only the first copolymer combined with the second homopolymer.

The at least a first polymer and second polymer can preferably be independently made via polycondensation of one or more types of diamine monomer with one or more types of chloride monomers in a dialkyl amide solvent such as N-methyl pyrrolidone, dimethyl acetamide, or mixtures thereof. In some embodiments the preferred solvent is dimethyl acetamide. In some embodiments of the polymerizations of this type an inorganic salt such as lithium chloride or calcium chloride is also present. If desired the polymer can be isolated by precipitation with non-solvent such as water, neutralized, washed, and dried. The polymer can also be made via interfacial polymerization that produces polymer powder directly that can then be dissolved in a solvent for film production.

Film is made from a homogeneous mixture of at least a first polymer and second polymer in a solution. A solution suitable for casting a film containing the homogeneous mixture can be achieved by a number of ways. These include polymerizing the first polymer in a solvent and isolating that first polymer as a solid, and then polymerizing separately the second polymer in a solvent and isolating that second polymer as a solid. The two solids are then mixed to form a mixture of solids and dissolved in a suitable solvent in amount that forms a homogeneous solution of the polymers suitable for making films. Alternatively, the first polymer can be polymerized in a solvent to form a first polymer solution and the second polymer can be polymerized in a solvent to form a second polymer solution. The two solutions can then be mixed to form a homogeneous solution of polymers suitable for making films. Other combinations of these methods are possible, as is other possible methods of forming a solution that is suitable for making films that contains a homogeneous mixture of at least the first polymer and second polymer.

Films may be made by extruding a solution from a slit die, similar to the manner of spinning of fibers through a multihole spinneret, by wet spinning, dry spinning, or dry-jet wet spinning (also known as air-gap spinning). Exemplary dry, wet, and dry-jet wet polymer solution extrusion processes are disclosed U.S. Pat. Nos. 3,063,966; 3,227,793; 3,287,324; 3,414,645; 3,869,430; 3,869,429; 3,767,756; and 5,667,743. Films can also be made by casting the mixed polymer solution on a polished metal surface and calendering. In some methods, the film can be continuously made by casting the polymer solution onto a surface, such as a belt or a rotating roll, which is provided with a plenum chamber to provide a gas that strips the solvent from the cast film. After formation, the film can then be treated to neutralize, wash, dry, calender, or heat treat as needed using conventional techniques to make stable and useful films.

It has been found that when the homogeneous solution of the mixture of polymers described herein is extruded through a die having regular single holes, the filaments that are formed have a surprising sheath-core-like structure, and it is believed that films spun from a single hole slit die also provide a film having a sheath-core structure. Surprisingly, this structure is believed to be formed during coagulation of the dope and does not require special sheath-core designed dies or capillaries. For purposes herein, the term "fiber" is defined as a relatively flexible, macroscopically homogeneous body having a high ratio of length to the width of the cross-sectional area perpendicular to that length. The fiber cross section can be any shape, but is typically round. Preferably the fibers are generally solid without macroscopic voids or holes or annular open regions. Herein, the term "filament" or "continuous filament" is used interchangeably with the term "fiber."

Figure 2:
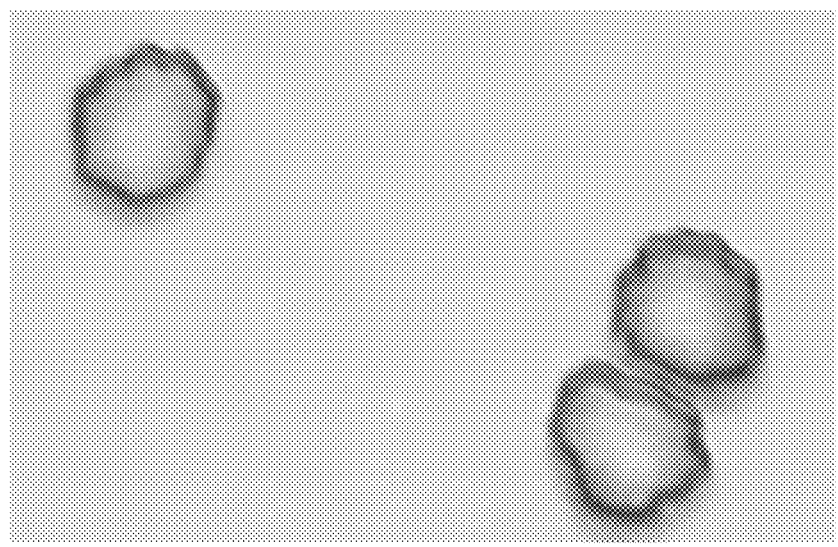
FIG. 2 is a photographic representation of dyed filament cross-section having a composition, by weight, of 35% first polymer and 65% second polymer, as spun through standard round spinneret holes.

A cross-section of the coagulated fiber reveals the fiber has a first polymer-rich zone for the sheath, a second polymer-rich zone for the core, and a transition zone having a combination of the first and second polymers. The thickness of the first polymer-rich zone sheath and the second polymer-rich zone is determined by the relative amounts of first polymer and the second polymer in the homogeneous solution. The surprising sheath-core structure is illustrated in FIG. 1 and FIG. 2. FIG. 1 is a photographic representation of coagulated filaments made from a homogeneous mixture of 50 weight percent MPD-I polymer and 50 weight percent DABPI-I/T (60/40 mole %) copolymer that has in turn been dyed with acidic dye. The figures reveal the resulting fiber has three zones. The first is a MPD-I rich zone at the center or core of the filaments that is uncolored or undyed by the acidic dye. The second is a DAPBI-I/T rich zone that forms the outer sheath and that is significantly dyed a dark shade, representative of the ability to color or dye that copolymer with acid dyes. Between the uncolored core and the colored sheath is a partially colored or dyed transition zone that contains a mixture of the two polymers. It is believed the figures confirm there is a gradient between the MPD-I rich core to the DAPBI-I/T rich sheath, with the transition zone having a mixture of DAPBI-I/T & MPD-I, wherein in the transition zone the mixture has a higher weight percentage of the MPD-I polymer nearer the core and a higher weight percentage of the DAPBI-/I/T copolymer nearer the sheath. FIG. 2 is a photographic representation of cross-sections similarly dyed filaments made from same first and second polymers; however these polymers are made from a mixture of 65 weight percentage MPD-I and 35 weight percentage DAPBI-I/T (60/40 mole %). The resultant fibers have a larger core zone and a smaller sheath zone due to the relative increase in the amount of core polymer versus the sheath polymer.

Although not to be bound by theory, it is believed this surprising sheath-core structure is the result of differing rates of solvent removal from the individual polymers in the mixture during coagulation and/or quenching. Coagulation rate of the MPD-I polymer is believed to be significantly higher than the coagulation rate of either the DAPBI-I/T copolymer or DAPBI/MPD-I/T copolymer, meaning the core material (MPD-I) coagulates first, pushing the slower coagulating copolymer (DAPBI-I/T or DAPBI/MPD-I/T) to the filament surface. It is believed the preferred process is to conduct this multi-stage coagulation using wet spinning, where the combination of preferred coagulant (water) and residence time in the coagulation bath is sufficient to allow the slower coagulating and more mobile copolymer to be forced to the surface of the filament during coagulation. However, it is believed that any fiber spinning arrangement could be used, assuming a suitable coagulation system, involving a suitable coagulant and suitable residence time was used.

Further, it is believed that the same coagulation theory also applies to a film made by coagulation of the homogeneous mixture, and that the film has the same three zones, namely a MPD-I rich zone at the film center that is uncolored or undyed by the acidic dye; a DAPBI-I/T rich zone that forms the outer film surface and that is significantly dyed a dark shade, representative of the ability to color or dye that copolymer with acid dyes; and between the film center and the outer surface is a transition zone having a mixture of DAPBI-I/T & MPD-I. Further it is believed in the transition zone the mixture has a higher weight percentage of the MPD-I polymer nearer the film center and a higher weight percentage of the DAPBI-/I/T copolymer nearer the film surface.

The filaments can be collected as continuous filament fibers and multifilament yarns of continuous filaments by processes well known to those skilled in the art. For example, multifilament continuous filament yarns can be made by winding filament thread lines directly on a bobbin, with or without twist; or if needed, combining multiple filament thread lines to form higher denier yarns.

Alternatively, the homogeneous mixture of the first polymer and second polymer can be used to make films that can be collected on bobbins by processes known to those skilled in the art. For the purposes herein, the term "film" is considered a continuous layer of polymer in the form of a thin sheet. A film is relatively flexible, has a macroscopically homogeneous body generally having a rectangular solid cross-section perpendicular to the length and having a width that is larger than the thickness by several orders of magnitude.

In some particularly useful embodiments, the films are useful as a part of electrical insulation systems for different electrical devices including motors, generators, and transformers, and, also, for different structural composites including face sheets for sandwich panels. Multiple layers of the film can be laminated or bonded together to create thicker sheets, or the films can be laminated to papers or boards or to fabrics.

The film can be colored using methods similar to those disclosed in, for example, U.S. Pat. Nos. 4,668,234; 4,755,335; 4,883,496; and 5,096,459 that are used to color shaped structures. A dye assist agent, also known as a dye carrier, may be used to help increase dye pick up by the film. By dyeing the film with the use of a dye carrier the crystallinity of the film may be increased. Useful dye carriers include aryl ether, benzyl alcohol, or acetophenone.

TEST METHODS

Dyeing Procedure. Make up the dye module with 300 ml of de-ionized water, 50 ml of benzyl alcohol (carrier) and 0.2180 grams of the sample to be dyed and close the cap tight. Place the dye module in heating chamber of the dyeing machine Ahiba Polymat by Data Color Type PM 80086. Set the temperature at 70° C., and run for 10 minutes. Take out the dye module from the machine, and add 2 weight percent dye, based on the weight of the sample, and dissolve in the solution. Place the dye module back in the dyeing machine and set the temperature at 130° C. and run for one hour. Cool the dye bath to room temperature and open the machine. Remove the module from the machine and open. Take out the sample and rinse with de-ionized water several times. Scour the sample with detergent thoroughly and squeeze out the excess water. Dry the sample in an oven at 120° C. overnight.

EXAMPLES

The invention is illustrated by, but is not intended to be limited by the following examples. Unless otherwise stated, the relative amount of polymer and copolymer provided in a mixture is represented in weight percent, based on the total amount of the polymer and copolymer mixed together, and the relative amount of amine or acid monomers used in the copolymers is provided in mole percent based on the total amount of that type of monomer (amine or acid monomer) in the copolymer.

Example 1

Preparation of MPD-I Homopolymer

A polymer solution having a MPD-I polymer concentration of 19.3% by weight was made in the following manner. 214.2 grams of DMAc and 18.168 grams (0.168 moles) of 1,3-phenylenediamine (MPD) were added to a 1-liter reaction kettle, equipped with a basket stirrer and a nitrogen inlet/outlet. The contents were stirred under a nitrogen blanket at room temperature until solid particles of MPD were completely dissolved. The kettle was then placed in an ice-water bath and while stirring, the contents were cooled to ~10° C. The kettle was removed from the ice-water bath. 38.098 grams (0.168 moles) of isophthaloyl dichloride (ICl) was added to the reaction mixture in the kettle all at once. The solution slowly became viscous and thicker with time. When the solution viscosity reached the plateau (after one hour or so), 12.447 grams (0.168 moles) of calcium hydroxide (Ca(OH)$_2$) that had been slurried with an equal amount of DMAc, was added to the solution and then stirred vigorously until all solid particles of Ca(OH)$_2$ disappeared. Stirring was continued for an additional one hour to complete the neutralization. The reaction kettle was disassembled and placed in a vacuum oven and heated to 70° C. to evaporate additional DMAc and water until the total polymer solution weight was 207.2 grams.

Example 2

Preparation of DAPBI/MPD (80/20)-I/T(70/30) Copolymer 211.0 grams of DMAc and 8.427 grams of CaCl$_2$ were added to a 1 liter reaction kettle, equipped with a basket stirrer and a nitrogen inlet/outlet, and then heated to 70° C. to completely dissolve the CaCl$_2$. 13.364 grams (0.060 moles) of DAPBI [2-(p-aminophenyl)-5-aminobenzimidazole] was added to the hot solution and stirred until DAPBI was completely dissolved. The solution was then cooled to room temperature (25° C.) with stirring. 10.889 grams (0.054 moles) of ICl (isophthaloyl chloride) was then added, all at once, and stirred for 30 minutes. 1.765 grams (0.016 moles) of MPD (m-phenylene diamine) was then added and stirred until all MPD was dissolved. Then, 4.562 grams (0.022 moles) of TCl (terephthaloyl chloride) was added all at once and stirred for 60 minutes. The solution got more and more viscose with time, and the solution temperature rose to 55° C., and further increase was controlled by slowing down the stirrer. The resultant polymer concentration in the solution was 10% (w/w) and the $CaCl_2$/amine molar ratio was 1.000. To determine inherent viscosity, a small portion of the solution was isolated in the water and washed several times and dried in a 120° C. vacuum oven. The inherent viscosity measured in sulfuric acid (0.5 g/1 dl) was 2.65 dl/g.

Example 3

Preparation of DAPBI-T/I (40/60) Copolymer 372.4 grams of DMAc and 14.10 grams of $CaCl_2$ were added to a l liter reaction kettle, equipped with a basket stirrer and a nitrogen inlet/outlet, and then heated to 70° C. to completely dissolve the $CaCl_2$. 15.825 grams (0.071 moles) of DAPBI was added to the hot solution and stirred until the DAPBI is dissolved. The solution was cooled to room temperature (25° C.) with stirring. Then 5.730 grams (0.028 moles) of TCl was added all at once and stirred for 30 minutes, followed by addition of 8.617 grams (0.042 moles) of ICl. The reaction mixture was then stirred for 60 minutes. The solution got more and more viscose with time, and the solution temperature rose to 55° C., and further increase was controlled by slowing down the stirrer. The resultant polymer concentration in the solution was 6% (w/w) and the $CaCl_2$/amine molar ratio was 1.800. To determine inherent viscosity, a small portion of the solution was isolated in the water and washed several times and then dried in a 120° C. vacuum oven. The inherent viscosity measured in sulfuric acid (0.5 g/1 dl) was 5.09 dl/g.

Example 4

Preparation of a 78/22 Weight Percent Polymer Mixture of DAPBI/MPD (80/20)-I/T (70/30) Copolymer and MPD-I Homopolymer 80 grams of the DAPBI/MPD (80/20)-I/T(70/30) copolymer solution (8 g of polymer) of Example 2 was added to a reaction kettle equipped with disc stirrer and nitrogen inlet/outlet. 150 grams of the MPD-I homopolymer solution (28.95 g of polymer) of Example 1 was added and stirred for one hour at high speed. The solution temperature was controlled below 55° C. The mixture solution was placed in vacuum oven at room temperature overnight to remove bubbles generated during the mixing. The resultant solution was transparent and clear showing that the blend was compatible and was capable of being spun into fibers.

Example 5

Preparation of a 20/80 Weight Percent Polymer Mixture of DAPBI-I/T (60/40) Copolymer and MPD-I Homopolymer 120 grams of the DAPBI-I/T (60/40) copolymer solution (7.24 g of polymer) of Example 3 was added to a reaction kettle equipped with disc stirrer and nitrogen inlet/outlet. 150 grams of the MPD-I homopolymer solution (28.95 g of polymer) of Example 1 was added and stirred for one hour at high speed. The solution temperature was controlled below 55° C. The mixture solution was placed in vacuum oven at room temperature overnight to remove bubbles generated during the mixing. The resultant solution was transparent and clear showing that the blend was compatible and was capable of being spun into fibers.

Example 6

Preparation of a 50/50 Weight Percent Polymer Mixture of DAPBI-I/T (60/40) Copolymer and MPD-I Homopolymer 475 grams of the DAPBI-I/T(60/40) copolymer solution (28.95 grams of polymer) of Example 3 was added to a reaction kettle equipped with disc stirrer and nitrogen inlet/outlet. 150 grams of the MPD-I solution (28.95 g of polymer) of Example 1 was added and stirred for one hour at high speed. The solution temperature was controlled below 55° C. The mixture solution was placed in vacuum oven at room temperature overnight to remove bubbles generated during the mixing. The resultant solution was transparent and clear showing that the blend was compatible and was capable of being spun into fibers.

Comparison Example A

Preparation of Incompatible 22/78 Weight Percent Polymer Mixture of DAPBI/MPD (50/50)-I/T (25/75) Copolymer and MPD-I Homopolymer A DAPBI/MPD (50/50)-I/T(25/75) copolymer was made as follows. 297.1 grams of DMAc and 11.242 grams of $CaCl_2$ were added to a l liter reaction kettle, equipped with a basket stirrer and a nitrogen inlet/outlet, and then heated to 70° C. to completely dissolve the $CaCl_2$. 7.571 grams (0.034 moles) of DAPBI was added to the hot solution and stirred until the DAPBI was completely dissolved. To this solution, 3.651 grams (0.034 moles) of MPD was added and dissolved. The solution was cooled to room temperature (25° C.) with stirring. Then, 10.306 grams (0.054 moles) of TCl was added all at once and stirred for 5 minutes and then 3.435 grams (0.017 moles) of ICl was added and stirred for 60 minutes. The solution got more and more viscose with time, and the solution temperature rose to 55° C., and further increase was controlled by slowing down the stirrer. The resultant polymer concentration in the solution was 6% (w/w) and the $CaCl_2$/amine molar ratio was 1.500. To determine inherent viscosity, a small portion of the solution was isolated in the water and washed several times and then dried in a l 20° C. vacuum oven. The inherent viscosity measured in sulfuric acid (0.5 g/1 dl) was 3 dl/g.

133 grams of the DAPBI/MPD (50/50)-I/T (25/75) copolymer solution (8 grams of polymer) was added to a reaction kettle equipped with disc stirrer and nitrogen inlet/outlet. 150 grams of the MPD-I solution (28.95 grams of polymer) was added and stirred for one hour at high speed. The % copolymer was 21.6% (w/w) in the blend. The solution temperature was controlled below 55° C. The mixture solution was placed in vacuum oven at room temperature overnight to remove bubbles generated during the mixing. The resultant solution separated into two phases—one clear top layer and an opaque bottom layer, meaning this solution could not be spun into fibers.

Comparison Example B

Preparation of Incompatible 22/78 Weight Percent Polymer Mixture of DAPBI/MPD (40/60)-T Copolymer and MPD-I Homopolymer 375.5 grams of DMAc and 9.750 g of $CaCl_2$ were added to a l liter reaction kettle equipped with a basket stirrer and a nitrogen inlet/outlet and then heated to 70° C. to completely dissolve the CaCl₂. 7.880 grams (0.035 moles) of DAPBI was added to the hot solution and stirred until the DAPBI was completely dissolved. To this solution, 5.699 grams (0.053 moles) of MPD was added and dissolved. The solution was cooled to room temperature (25° C.) with stirring. 17.177 grams (0.085 moles) of TCl was then added all at once and stirred for 60 minutes. The solution got more and more viscose with time, and the solution temperature rose to 55° C., and further increase was controlled by slowing down the stirrer. The resultant polymer concentration in the solution was 6% (w/w) and the CaCl₂/amine molar ratio was 1.000. To determine inherent viscosity, a small portion of the solution was isolated in the water and washed several times and dried in 120° C. vacuum oven. The inherent viscosity measured in sulfuric acid (0.5 g/1 dl) was 2.89 dl/g.

133 grams of the DAPBI/MPD (40/60)-T copolymer solution (8 grams of polymer) was added to a reaction kettle equipped with disc stirrer and nitrogen inlet/outlet. 150 grams of the MPD-I solution (28.95 grams of polymer) was added and stirred for one hour at high speed. The % copolymer was 21.6% (w/w) in the blend. The solution temperature was controlled below 55° C. The mixture solution was placed in vacuum oven at room temperature overnight to remove bubbles generated during the mixing. The resultant solution exhibited micro-phase separation. The solution looked opaque with a syrupy cottage-cheese appearance. This solution could not be spun into fibers.

Example 7

Preparation of Fibers from 78/22 Weight Percent Polymer Mixture of DAPBI/MPD (80/20)-I/T (70/30) Copolymer and MPD-I Homopolymer The clear 78/22 polymer mixture of DAPBI/MPD (80/20)-I/T(70/30) Copolymer and MPD-I Homopolymer of Example 4 was charged into the metal syringe very carefully to prevent entrapment of air bubbles. The syringe filled was placed onto the syringe wet-spinning unit and the room-temperature polymer mixture was pumped out of the syringe through a136-hole spinneret having 2.5 mil diameter capillaries. Once the system was completely filled with the solution and full flow established from the spinneret, the spinneret was immersed beneath the surface of a water coagulation bath maintained at room temperature. The wet-spun extruded filaments passed through the coagulation bath at 5 yards per minute and were wound up on a perforated metal bobbin. Filament linear density was approximately 2 to 3 denier per filament. The resulting bobbin was then placed in de-ionized water to extract the solvent, and the water was changed several times to insure good removal of the solvent. The filaments were dried in a hot tube at 250° C. and collected on a bobbin.

Example 8

Preparation of Fibers from 20/80 Weight Percent Polymer Mixture of DAPBI-I/T (60/40) Copolymer and MPD-I Homopolymer Dried filaments on a bobbin were made as in Example 7 using the 20/80 Polymer Mixture of DAPBI-I/T (60/40) Copolymer and the MPD-I homopolymer of Example 5.

Example 9

Preparation of Fibers from 50/50 Weight Percent Polymer Mixture of DAPBI-I/T(60/40) Copolymer and MPD-I Homopolymer Dried filaments on a bobbin were made as in Example 7 using the 50/50 Polymer Mixture of DAPBI-I/T (60/40) Copolymer and MPD-I homopolymer of Example 6.

Example 10

Dyeability of Filaments Made from Polymer Mixture

Samples of fiber from the bobbins of filaments made in Examples 8, 9, and 10 were tested for dyeability per the Dyeing Procedure test method and physical properties. All fiber samples were found to be dyeable with acidic dyes and have fiber tenacities in the ranges of from 2-4 grams per denier, depending upon the polymer composition.

Example 11

Effect of Acid and Basic Dyes

To further examine the effect of dye type, the fiber spinning process of Example 7 was used to spin a first control fiber utilizing 100% of the DAPBI-T/I (40/60) Copolymer of Example 3. A second control fiber was also made using the fiber spinning process of Example 7, utilizing 100% of the MPD-I homopolymer of Example 1.

In addition, following the procedures of Example 5 and 6, a 35%/65% polymer mixture of the DAPBI-T/I (40/60) Copolymer of Example 3 and the MPD-I homopolymer of Example 1 was made, and fiber was spun from that Polymer mixture using the process of Example 7.

These three fibers, along with the fiber from the 50/50 polymer mixture of DAPBI-I/T (60/40) copolymer and MPD-I homopolymer of Examples 9 were then dyed with acidic and basic dyes per the Dyeing Procedure test method. Both the acidic and basic dyes were red dyes.

Results are shown for the various compositions in Table. The two control fibers showed the natural characteristic of the 100% polymer. Fiber of 100% DAPBI-I/T readily accepts acidic dye and was dyed a red color. Basic dyes did not dye the fiber red. Fiber of 100% MPD-I was only slightly dyeable with red basic dyes, illustrating the general challenge with dyeing the homopolymer. The MPD-I fiber was even less dyeable with acidic dyes, being very slightly tinted. Fibers made from the mixture of these polymers demonstrate surprising dyeability—the DAPBI-I/T dyeability—due to the unexpected position of the DAPBI-I/T polymer on the outer surface of the fiber.

TABLE

| DAPBI-I/T wt % | MPD-I wt % | Color After Acidic Dyeing | Color After Basic Dyeing |
|---|---|---|---|
| 100 | 0 | Dark Red | Yellow |
| 50 | 50 | Dark Red | Beige |
| 35 | 65 | Dark Red | Beige |
| 0 | 100 | Tinted | Dark Pink |

Comparison Example C

Fiber from Polyacrylonitrile Homopolymer/MPD-I Blend Solution

Using reaction equipment as in the prior examples, 20 grams of polyacrylonitrile homopolymer was dissolved in 80 grams of DMAc at room temperature by stirring with basket stirrer under nitrogen at room temperature in the reaction kettle. The polymer was completely dissolved in the solvent, making a transparent/clear solution.

296 grams of the 19.3% MPD-I solution in DMAc/CaCl2 from Example 1 was added to the polyacrylonitrile homopolymer solution prepared above and mixed for one hour in high shear. The blend solution was placed in 50° C. vacuum oven overnight to degas it. This solution was used for wet-spinning using the same procedure described in Example 7. The fiber was washed and dried the same way as Example 7.

The resulting fiber was placed in dyeing machine and dyed with basic dyes using the same Dyeing Procedure test method. As a control, 100% MPD-I fiber was also dyed with basic dyes using the same Dyeing Procedure test method. The fiber made from the blend of polyacrylonitrile homopolymer/MPD-I was colored or dyed as well as 100% MPD-I fiber. This indicates sheath/core separation of the polymer components in the polyacrylonitrile homopolymer/MPD-I blend did not occur, because polyacrylonitrile homopolymer by itself is not dyeable with basic dyes. If a sheath/core fiber had been formed with polyacrylonitrile homopolymer in the sheath, it should not have been dyeable. Subsequent testing showed that like DAPBI-I/T copolymers, the coagulation rate of acrylonitrile homopolymer in room temperature water is slower than the coagulation rate of MPD-I; however, the polyacrylonitrile homopolymer/MPD-I polymer blend does not provide the desired a similar fiber.

Example 12

Preparation of Film from 78/22 Polymer Mixture of DAPBI-I/T Copolymer and MPD-I Homopolymer A sample of the 78/22 polymer mixture in solution of Example 4 is diluted by the addition of DMAc to form a solution having 6 weight percent solids. The solution is degassed in vacuum oven at room temperature to eliminate air bubbles. The solution is then charged into a metal syringe very carefully to prevent entrapment of air bubbles. The syringe is then attached to a syringe spinning unit with a 2 mil slit die with 2" extrusion width. A 3-foot long coagulation bath is prepared with room temperature deionized water. The polymer solution is then extruded into the coagulation bath through the slit die and the resulting film travels though the 3-foot coagulation bath without stretch (1:1 stretch ratio) at a speed of 3 yards per minute. The coagulated film is transparent and wound on a perforated bobbin. The film sample on the bobbin is then placed in another de-ionized water bath for further extraction of the solvents overnight. The film is then dried in air and is subsequently heat treated on a hot shoe of 200 C. The film accepts coloration from acid dyes.

Example 13

Preparation of Film from 20/80 Polymer Mixture of DAPBI-I/T Copolymer and MPD-I Homopolymer Example 12 is repeated using the 20/80 polymer mixture in solution of Example 5. The film accepts coloration from acid dyes.

Example 14

Preparation of Film s from 50/50 Polymer Mixture of DAPBI-I/T Copolymer and MPD-I Homopolymer Example 12 is repeated using the 50/50 polymer mixture in solution of Example 6. The film accepts coloration from acid dyes.

What is claimed:

1. A film comprising a mixture of at least a first polymer and a second polymer;
   the first polymer being a 5(6)-amino-2-(p-aminophenyl) benzimidazole (DAPBI) polymer having a structure derived from the reaction of one or more amine monomers and a plurality of acid monomers, wherein
   i) the one or more amine monomers includes at least 60 mole percent 5(6)-amino-2-(p-aminophenyl)benzimidazole, based on the total amount of amine monomers; and
   ii) the plurality of acid monomers include those having a structure of

wherein $Ar_1$ is an aromatic group having para-oriented linkages and $Ar_2$ is an aromatic group having meta-oriented linkages, and wherein the plurality of acid monomers has at least 50 mole percent of the monomer containing aromatic group $Ar_2$; and
   the second polymer being poly(metaphenylene isophthalamide) (MPD-I),
   the film having a MPD-I rich zone at the film center, a DAPBI polymer rich zone forming the outer film surface, and a transition zone between the film center and the outer surface that is a mixture of the MPD-I and DAPBI polymers.

2. The film of claim 1, wherein the one or more amine monomers is 100 mole percent 5(6)-amino-2-(p-aminophenyl) benzimidazole.

3. The film of claim 1, wherein the one or more amine monomers include metaphenylene diamine.

4. The film of any one of claims 1 to 3, wherein the mixture of first polymer and second polymer contains 25 to 80 weight percent of the first polymer, based on the total amount of first polymer and second polymer.

5. The film of claim 4, wherein the mixture of first polymer and second polymer contains 25 to 50 weight percent of the first polymer, based on the total amount of first polymer and second polymer.

* * * * *